United States Patent
Cheng et al.

(10) Patent No.: US 12,356,521 B2
(45) Date of Patent: Jul. 8, 2025

(54) BRIGHTNESS CONTROL DEVICE AND BRIGHTNESS CONTROL METHOD

(71) Applicant: Quanta Computer Inc., Taoyuan (TW)

(72) Inventors: Kai-Ju Cheng, Taoyuan (TW); Huan-Pin Shen, Taoyuan (TW); Huan-Tang Wu, Taoyuan (TW); Chin-Kang Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 119 days.

(21) Appl. No.: 18/299,863

(22) Filed: Apr. 13, 2023

(65) Prior Publication Data

US 2024/0284570 A1    Aug. 22, 2024

(30) Foreign Application Priority Data

Feb. 18, 2023    (TW) .................................. 112105951

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
CPC ...... H05B 45/325; H05B 45/10; H04N 23/56; H04N 23/74; G03B 15/03
USPC ........................................................ 315/291
See application file for complete search history.

(56) References Cited

U.S. PATENT DOCUMENTS

| | | | | |
|---|---|---|---|---|
| 4,804,986 A | * | 2/1989 | Ohnuki ................. | G03B 19/12 396/452 |
| 7,898,593 B2 | * | 3/2011 | Sullivan ................ | H04N 23/56 348/370 |
| 8,797,394 B2 | * | 8/2014 | Watanabe ......... | B60R 21/01552 701/36 |
| 9,439,261 B2 | * | 9/2016 | Shih ....................... | H04N 23/72 |
| 2005/0088568 A1 | | 4/2005 | Uenaka | |
| 2005/0157205 A1 | * | 7/2005 | Voss ....................... | H04N 23/74 348/370 |
| 2005/0231633 A1 | * | 10/2005 | Yuyama ................. | H04N 23/56 348/370 |

(Continued)

FOREIGN PATENT DOCUMENTS

| | | |
|---|---|---|
| CN | 2901728 Y | 5/2007 |
| CN | 208079462 U | 11/2018 |
| EP | 2953350 A1 | 12/2015 |

OTHER PUBLICATIONS

Extended European Search Report dated Oct. 10, 2023, issued in application No. EP 23170628.4.

(Continued)

*Primary Examiner* — Ryan Jager
(74) *Attorney, Agent, or Firm* — McClure, Qualey & Rodack, LLP

(57) ABSTRACT

A brightness control device for controlling light-emitting diodes (LEDs) during a video recording performed by an image sensor. The brightness control device includes a pulse width modulation (PWM) signal output unit and a brightness control signal generation unit. The signal output unit is configured to provide at least one PWM signal. The brightness control signal generation unit is configured to generate a brightness control signal according to an exposure signal of the image sensor and the at least one PWM signal.

4 Claims, 7 Drawing Sheets

(56) References Cited

U.S. PATENT DOCUMENTS

| | | | |
|---|---|---|---|
| 2005/0270413 A1* | 12/2005 | Hatano | H04N 23/74 |
| | | | 348/370 |
| 2006/0038916 A1* | 2/2006 | Knoedgen | H04N 17/00 |
| | | | 348/371 |
| 2007/0031138 A1* | 2/2007 | Yamashita | G03B 17/02 |
| | | | 396/164 |
| 2007/0090962 A1* | 4/2007 | Price | G08B 5/36 |
| | | | 340/815.45 |
| 2010/0123820 A1* | 5/2010 | Tsai | H04N 23/74 |
| | | | 348/370 |
| 2011/0141314 A1* | 6/2011 | Liu | H04N 9/3155 |
| | | | 348/E9.053 |
| 2017/0237887 A1 | 8/2017 | Tanaka | |
| 2021/0219395 A1* | 7/2021 | McGrath | H05B 45/24 |
| 2023/0354495 A1* | 11/2023 | Kuta | H05B 47/17 |
| 2024/0284570 A1* | 8/2024 | Cheng | H05B 45/325 |

OTHER PUBLICATIONS

Chinese language office action dated Jan. 5, 2024, issued in application No. TW 112105951.

Office Action dated Apr. 16, 2025, issued in application No. EP 23170628.4.

* cited by examiner

BRIGHTNESS CONTROL DEVICE AND BRIGHTNESS CONTROL METHOD

CROSS REFERENCE TO RELATED APPLICATIONS

This application claims priority of Taiwan Patent Application No. 112105951, filed on Feb. 18, 2023, the entirety of which is incorporated by reference herein.

BACKGROUND OF THE INVENTION

Field of the Invention

The present invention relates to a brightness control device and a brightness control method for light-emitting diodes (LEDs).

Description of the Related Art

In the current generation of video recording devices, in order to maintain image quality when the ambient light source is low, high-brightness light-emitting diodes (LEDs) are usually used as light sources for light supplementation to ensure sufficient brightness in the recording environment so that image sensors can capture images with sufficient brightness.

However, while LEDs provide light, they also generate relatively great thermal energy. Continuously driving LEDs during video recording will not only increase energy consumption but also generate a lot of thermal energy, which may cause the video recording device to overheat, which may even damage the video recording device.

BRIEF SUMMARY OF THE INVENTION

Based on the above-mentioned problems, the present invention provides a brightness control device and a brightness control method that utilize the technology of control signal modulation for driving LEDs to provide sufficient brightness when an image sensor captures images (frames) and reduce the brightness of the LEDs when the image sensor is not capturing images. According to the present invention, the energy consumed by the LEDs can be reduced, and the thermal energy that the LEDs generate can be also reduced, even ensuring that the brightness of the images captured by the image sensor is sufficient.

An embodiment of the present invention provides a brightness control device for controlling light-emitting diodes (LEDs) during a video recording performed by an image sensor. The brightness control device comprises a pulse width modulation (PWM) signal output unit and a brightness control signal generation unit. The signal output unit is configured to provide at least one PWM signal. The brightness control signal generation unit is configured to generate a brightness control signal according to an exposure signal of the image sensor and the at least one PWM signal.

Another embodiment of the present invention provides a brightness control method for controlling light-emitting diodes (LEDs) during a video recording operation performed by an image sensor. According to the brightness control method, at least one PWM signal is provided, and a brightness control signal is generated according to an exposure signal of the image sensor and the at least one PWM signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

A brightness control device 1 of Embodiment 1 of the present invention will be described with reference to FIG. 1, which is a block diagram of the hardware configuration of the brightness control device 1 in a video recording device according to Embodiment 1 of the present invention.

Figure 1:
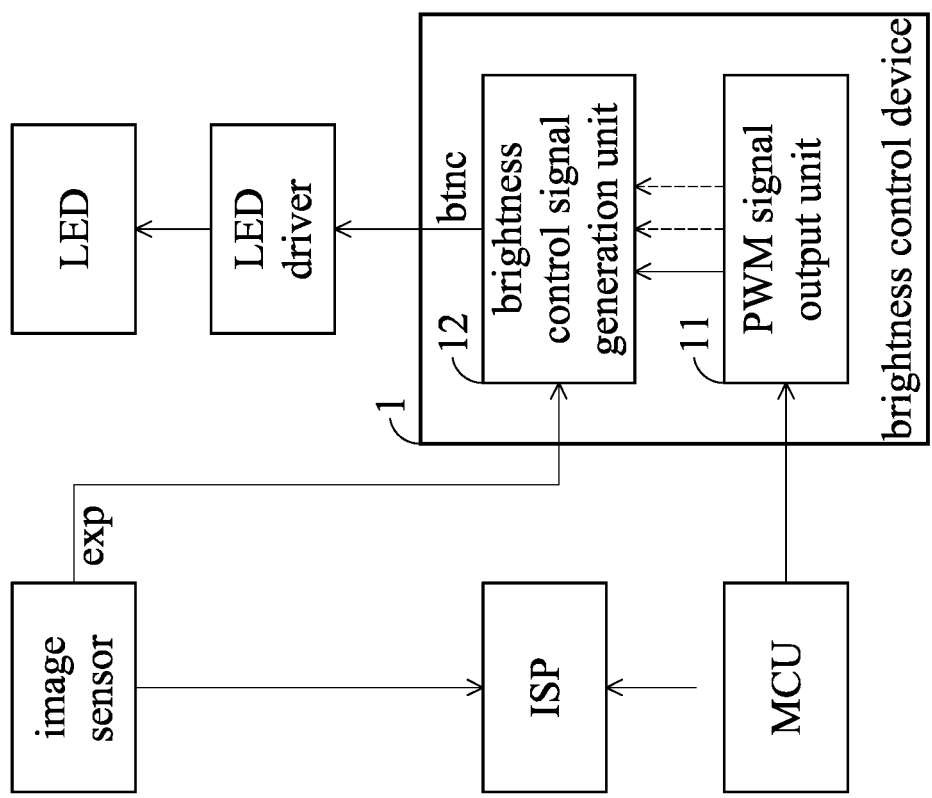
FIG. 1 is a block diagram showing the hardware configuration of a brightness control device in a video recording device according to Embodiment 1 of the present invention.

As shown in FIG. 1, the video recording device comprises a microcontroller (MCU) for control, an image sensor (also referred to as a photosensitive element) that converts optical images into electronic signals (that is, the image sensor captures images), an image signal processor (ISP) that processes image signals, LEDs that serve as a light source for light supplementation, and an LED driver that drives the LEDs.

The brightness control device 1 comprises a pulse width modulation (PWM) signal output unit 11 and a brightness control signal generation unit 12. The PWM signal output unit 11 and the brightness control signal generation unit 12 can be implemented by an electronic circuit, software, and/or firmware. The electronic circuit can be, for example, a single circuit, a composite circuit, a programmable processor, a parallel programmable processor, a logic integrated circuit (IC), a gate array (GA), an application specific integrated circuit (ASIC) or field programmable gate logic array (FPGA), an MCU, or a combination thereof.

While the video recording device performs a video recording operation, the MCU first transmits a video-recording start signal to the ISP. At this time, the PWM signal output unit 11 detects the start of the video recording operation and continuously generates at least one PWM signal. The PWM signal output unit 11 can detect the start of the video recording operation by various means. For example, the MCU may transmit a signal to the PWM signal output unit 11 through an electronic line to instruct the PWM signal output unit 11 to generate a PWM signal. Alternatively, the PWM signal output unit 11 may be comprised in the MCU. In other words, the MCU in the video recording device can also perform the operation of the PWM signal output unit 11, and the MCU starts to generate the PWM signal when the MCU transmits the video-recording start signal to the ISP. In another embodiment, the PWM signal output unit 11 can be connected to one input terminal of the MCU to detect whether a command indicating the start of the video recording operation is received.

Figure 3:
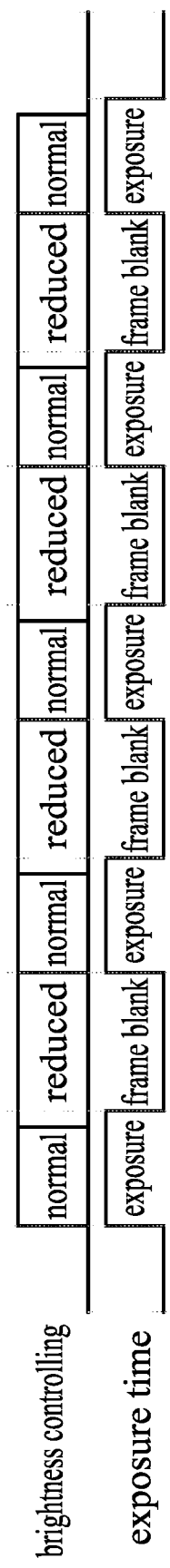
FIG. 3 is a schematic diagram showing the relationship between brightness control and exposure time of an image sensor in a modified example of Embodiment 1 of the present invention.

When the video recording operation starts, the image sensor periodically captures an optical image (referred to as exposure) according to an exposure signal exp. The image sensor then converts the optical image into an image signal and transmits the image signal to the ISP. The exposure signal exp is a signal that determines the exposure time of the image sensor. In the embodiment, the exposure signal exp is provided by the image sensor. However, in different video recording devices, the manner of generating the exposure signal and the name of the exposure signal may be different. For example, in another embodiment, an external electronic circuit may provide the exposure signal exp to the image sensor to determine the exposure time of the image sensor. A signal that comprises information about the time of starting the exposure and/or the time of ending the exposure can be used as the exposure signal. For example, a signal that is at high level during the period from the start of the exposure to the end of the exposure and at low level during the remaining time can be used as the exposure signal exp. Alternatively, a synchronization signal that indicates the time of starting the exposure can also be used as the exposure signal exp. As shown in FIG. 3, and as will be described later, in such cases, the time point of controlling the brightness does not have to be completely aligned with the exposure time.

Figure 2:
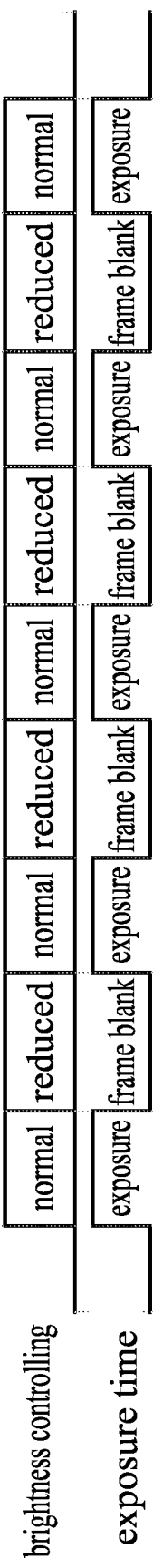
FIG. 2 is a schematic diagram showing the relationship between brightness control and exposure time of an image sensor according to Embodiment 1 of the present invention.

In the embodiment, the brightness control signal generation unit 12 is configured to receive the exposure signal exp from the image sensor and generate a brightness control signal btnc according to the exposure signal exp used to control the brightness of the LEDs. As shown in FIG. 2, in the embodiment, the brightness control signal btnc is designed to control the LED to emit light at normal brightness during the exposure period of the image sensor and also to control the LEDs to reduce the brightness during the non-exposure period of the image sensor (the frame blank period, which is the period when the image sensor does not generate frames). In addition, FIG. 2 shows an example where the time of controlling the brightness is exactly consistent with the exposure time. However, the time of controlling the brightness does not have to be completely aligned with the exposure time. For example, as shown in FIG. 3, the LEDs can be controlled to emit light at normal brightness only during a partial time interval of the exposure period of the image sensor. In FIGS. 2-3, the term "normal" represent the above normal brightness, while the term "reduced" represents the above reduced brightness.

Various examples of the hardware configuration of the brightness control signal generation unit 12 and the brightness control signal will be described further in Embodiment 1A, Embodiment 1B, and Embodiment 1C.

After the brightness control signal generation unit 12 generates the brightness control signal, the brightness control signal generation unit 12 outputs the brightness control signal to the LED driver so that the LED driver can control the brightness of the LEDs according to the brightness control signal.

Through Embodiment 1 of the present invention, the energy consumed by the LEDs can be reduced, and the thermal energy that the LEDs generate can be also reduced, even ensuring that the brightness of the images captured by the image sensor is sufficient.

Embodiment 1A is a modified example of Embodiment 1. Hereinafter, only the differences between Embodiment 1A and Embodiment 1 will be described.

Figure 4:
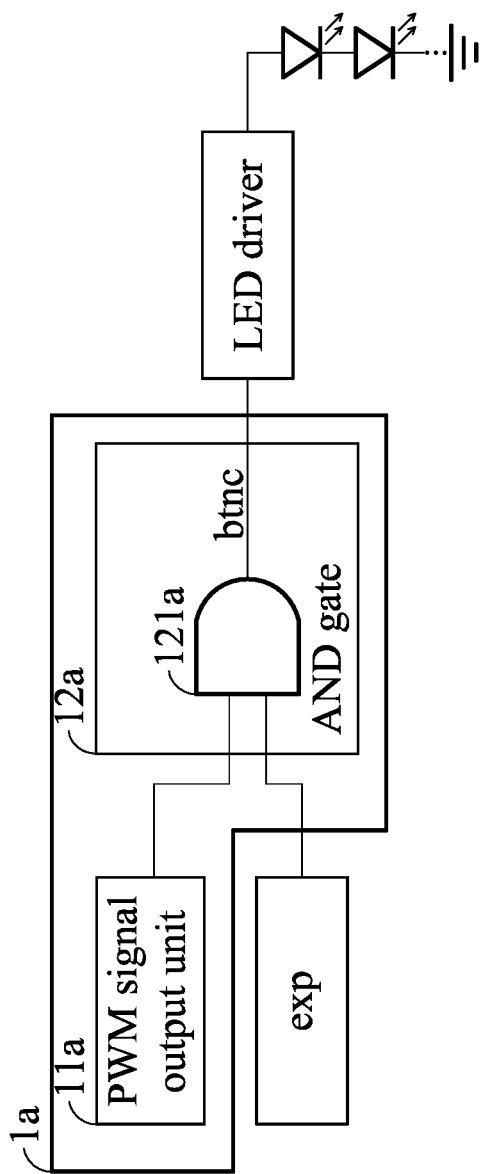
FIG. 4 is a schematic diagram showing the hardware configuration of a brightness control signal generation unit of a brightness control device according to Embodiment 1A of the present invention.

FIG. 4 is a schematic diagram showing the hardware configuration of a brightness control signal generation unit 12*a* of a brightness control device 1*a* according to Embodiment 1A of the present invention. As shown in FIG. 4, the brightness control signal generation unit 12*a* of the brightness control device 1*a* comprises an AND gate 121*a*. Two input terminals of the AND gate 121*a* are respectively connected to the output terminal of the PWM signal output unit 11*a* and the terminal of the image sensor that outputs the exposure signal exp. In the embodiment, the PWM signal output unit 11*a* outputs one PWM signal, and the duty ratio of the PWM signal can drive the LEDs to emit sufficient light for the image sensor to capture images with sufficient brightness.

Figure 5:
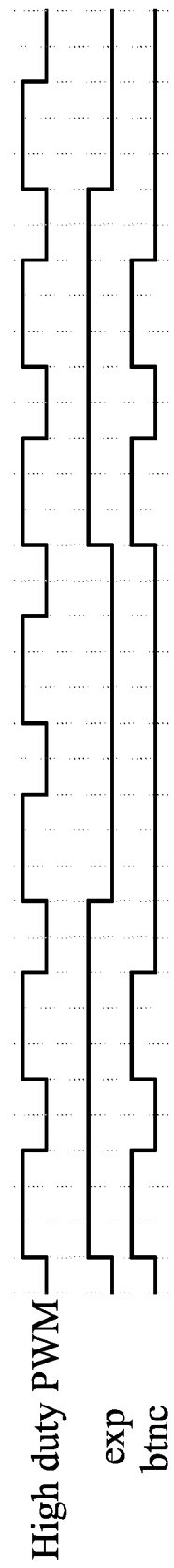
FIG. 5 is a signal timing diagram of the brightness control device in Embodiment 1A of the present invention.

After the calculation of the AND gate 121*a* is performed on the exposure signal exp and the PWM signal, the brightness control signal btnc is output, as shown in FIG. 5. The brightness control signal btnc of the embodiment equals to the PWM signal during the period when the exposure signal exp is active (for example, the period when the exposure signal exp is at high level), while the brightness control signal btnc is zero during the period when the exposure signal exp is inactive (for example, the period when the exposure signal exp is at low level. Therefore, the brightness control device 1*a* can control the LEDs to emit light with sufficient brightness through the PWM signal during the period when the image sensor is capturing images and further turn off the LEDs when the image sensor is not capturing any images.

Through Embodiment 1A of the present invention, the LEDs can be turned off when the image sensor is not capturing images, which reduces the energy consumed by the LEDs and the thermal energy that the LEDs generate, and further ensures that the brightness of the images captured by the image sensor is sufficient.

Embodiment 1B is also a modified example of Embodiment 1. Hereinafter, only the differences between Example 1B and Example 1 will be described.

Figure 6:
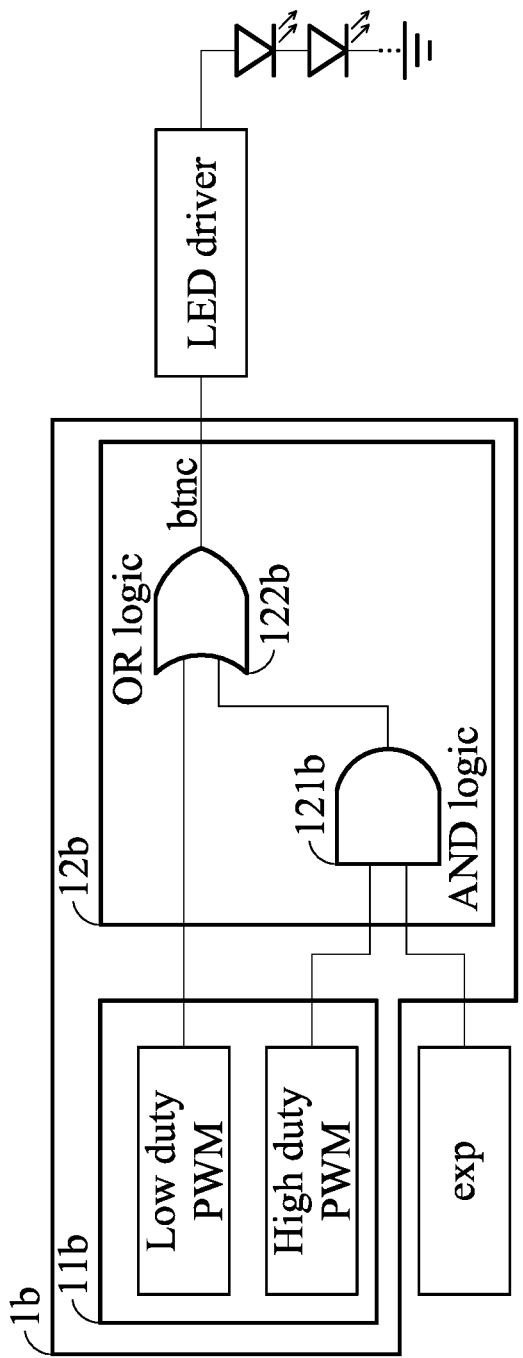
FIG. 6 is a schematic diagram showing the hardware configuration of a brightness control signal generation unit of a brightness control device according to Embodiment 1B of the present invention.

FIG. 6 is a schematic diagram showing the hardware configuration of a brightness control signal generation unit 12*b* of a brightness control device 1*b* according to Embodiment 1B of the present invention. In the embodiment, a PWM signal output unit 11*b* outputs a high duty-ratio PWM signal and a low duty-ratio PWM signal. The duty ratio of the high duty-ratio PWM signal drives the LEDs to emit sufficient light for the image sensor to capture images with sufficient brightness. For example, the duty ratio of the high duty-ratio PWM signal is between 20% and 80%, such as 60%. The duty ratio of the low duty-ratio PWM signal drives the LEDs to emit light of relatively low brightness. For example, the duty ratio of the low duty-ratio PWM signal is between 0% and 20%, such as 15%. The duty ratio of each of the high duty-ratio PWM signal and the low duty-ratio PWM signal can be adjusted according to requirements. For example, the brightness generated by different duty ratios is tested in advance, and the duty ratio of each of the high duty-ratio PWM signal and the low duty-ratio PWM signal is adjusted or determined according to the test result.

As shown in FIG. 6, the brightness control signal generation unit 12b of the brightness control device 1b comprises an AND gate 121b and an OR gate 122b. Two input terminals of the AND gate 121b are respectively connected to the terminal of the PWM signal output unit 11b that outputs the high duty-ratio PWM signal and the terminal of the image sensor that outputs the exposure signal exp. Two input terminals of the OR gate 122b are respectively connected to the output terminal of the AND gate 121b and the terminal of the PWM signal output unit 11b that outputs the low duty-ratio PWM signal.

Figure 7:
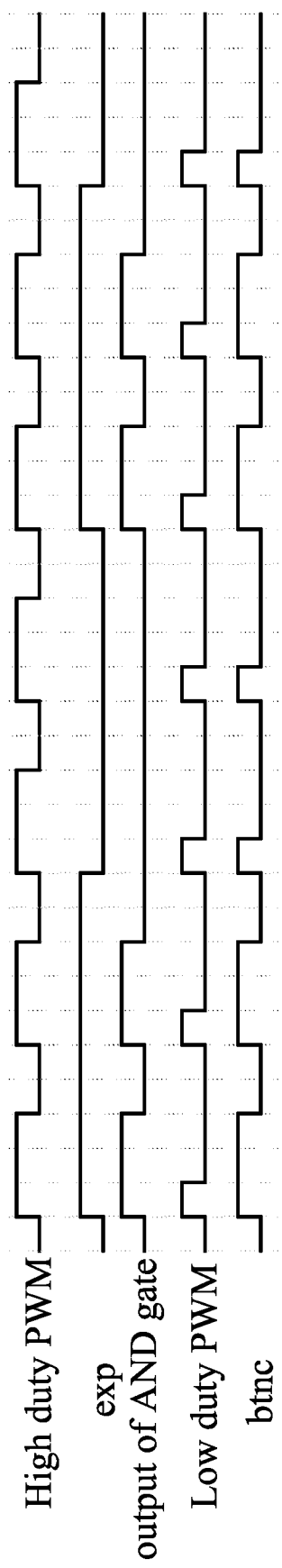
FIG. 7 is a signal timing diagram of the brightness control device in Embodiment 1B of the present invention.

FIG. 7 shows the signal that is output by the AND gate 121b after the calculation of the AND gate 121b is performed on the exposure signal exp and the high duty-ratio PWM signal and further shows the brightness control signal btnc that is output by the OR gate 122b after the calculation of the OR gate 122b is performed on the output signal of the AND gate 121b and the low duty-ratio PWM signal. In the embodiment, the brightness control signal btnc equals to the PWM signal with a high duty ratio during the period when the exposure signal exp is active, while the brightness control signal btnc equals to the PWM signal with a low duty ratio during the period when the exposure signal exp is inactive. Therefore, the brightness control device 1b can control the LEDs to emit light with sufficient brightness through the high duty-ratio PWM signal during the period when the image sensor is capturing images and further to control the LEDs to emit light with relatively low brightness through the low duty-ratio PWM signal during the period when the image sensor is not capturing images.

According to Embodiment 1B of the present invention, the energy that is consumed by the LEDs when the image sensor is not capturing images can be reduced, and the thermal energy that the LEDs generate can be also reduced, even ensuring that there is sufficient brightness for the image sensor to capture images. Since the embodiment can generate a low-brightness light source when the image sensor is not capturing images, low-brightness light can be continuously provided for the user of the video recording device, which reduces the discomfort to the user induced by switching the LEDs between high brightness and low brightness (or dark). As described above, Embodiment 1A completely turns off the LEDs when the image sensor is not capturing images. Thus, compared with Embodiment 1B, Embodiment 1A can further reduce the energy consumption and the amount of thermal energy that is generated when auxiliary lighting is not required by the user (for example: video recording for a gastroscope, etc.).

Embodiment 1C is also a modified example of Embodiment 1. Hereinafter, only the differences between Embodiment 1C and Embodiment 1 will be described.

Figure 8:
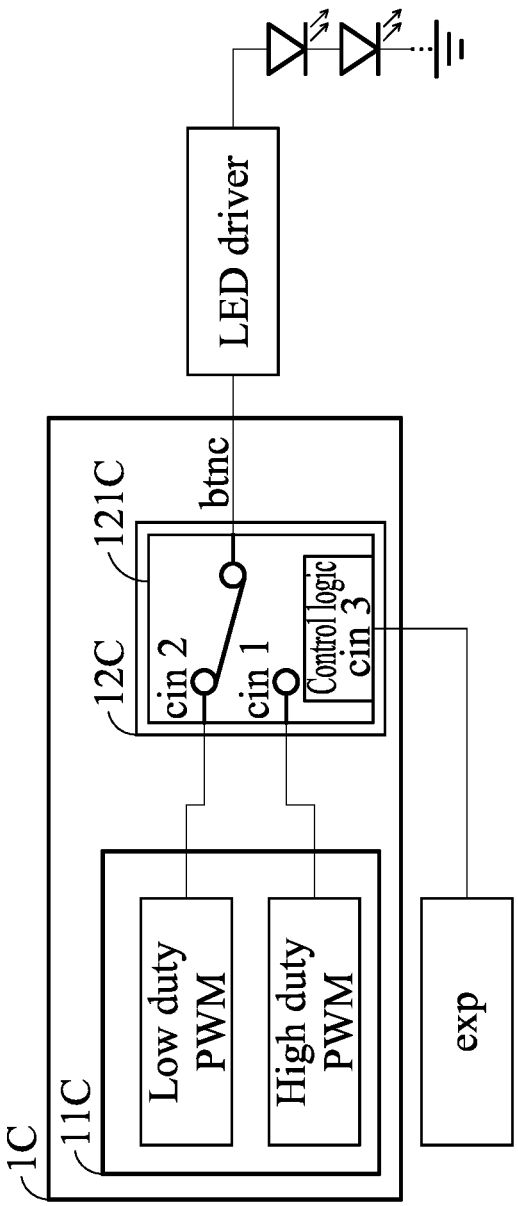
FIG. 8 is a schematic diagram showing the hardware configuration of a brightness control signal generation unit of a brightness control device according to Embodiment 1C of the present invention.

FIG. 8 is a schematic diagram of the hardware configuration of a brightness control signal generation unit 12c of a brightness control device 1c according to Embodiment 1C of the present invention. In the embodiment, a PWM signal output unit 11c outputs a high duty-ratio PWM signal and a low duty-ratio PWM signal. The high duty-ratio PWM signal and the low duty-ratio PWM signal are as described in Embodiment 1B, and the related description is omitted here.

As shown in FIG. 8, the brightness control signal generation unit 12c of the brightness control device 1c comprises a changeable switch control circuit 121c. The changeable switch control circuit 121c comprises three input terminals. The first input terminal cin1 of the changeable switch control circuit 121c is connected to the terminal of the PWM signal output unit 11c that outputs high duty-ratio PWM signal, the second input terminal cin2 thereof is connected to the terminal of the PWM signal output unit 11c that outputs low duty-ratio PWM signal, and the third input terminal cin3 thereof is connected to the terminal of the image sensor that outputs the exposure signal exp. The changeable switch control circuit 121c can be implemented by a logic control circuit that is configured to switch between the first input terminal cin1 and the second input terminal cin2 according to the exposure signal exp and to output the switched (or selected) input signal. The changeable switch control circuit 121c switches to the first input terminal cin1 (the high duty-ratio PWM signal) when the exposure signal exp is active and switches to the second input terminal cin2 (the low duty-ratio PWM signal) when the exposure signal exp is inactive.

Figure 9:
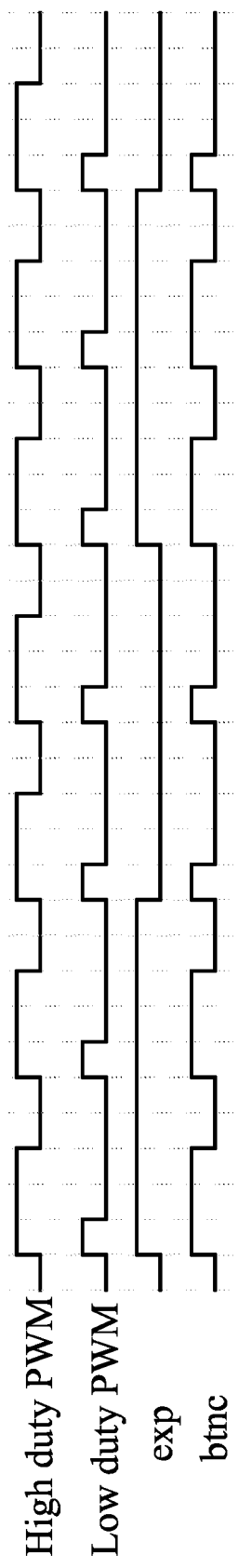
FIG. 9 is a signal timing diagram of the brightness control device in Embodiment 1C of the present invention.

The brightness control signal btnc output by the changeable switch control circuit 121c is shown in FIG. 9. Similar to the brightness control signal btnc of Embodiment 1B, the brightness control signal btnc of the present embodiment equals to the PWM signal with a high duty ratio during the period when the exposure signal exp is active while the brightness control signal btnc equals to the PWM signal with a low duty ratio during the period when the exposure signal exp is inactive. Through Embodiment 1C of the present invention, the energy that is consumed by the LED when the image sensor is not capturing images can be reduced, and the thermal energy that the LEDs generate can be also reduced, even ensuring that there is sufficient brightness for the image sensor to capture images.

Figure 10:
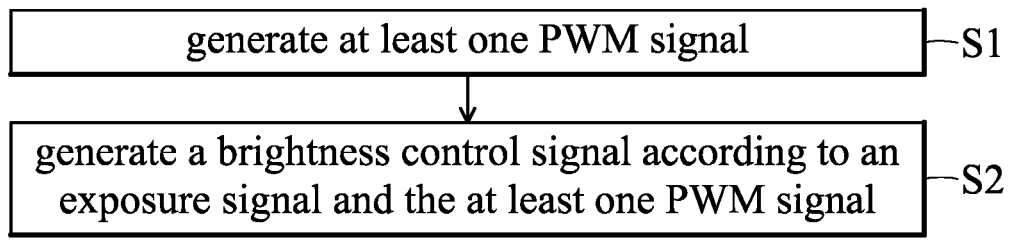
FIG. 10 is a flow chart of a brightness control method according to Embodiment 2 of the present invention.

Embodiment 2 of the present invention provides a brightness control method that controls the light-emitting diodes to provide a light source during a video recording operation performed by the image sensor. The brightness control method can be accomplished by an electronic circuit, software, and/or firmware that performs the steps of the brightness control method. The electronic circuit can be, for example, a single circuit, a composite circuit, a programmable processor, a parallel programmable processor, a logic integrated circuit (IC), a gate array (GA), an application specific integrated circuit (ASIC) or field programmable gate logic array (FPGA), an MCU, or a combination thereof. Hereinafter, the brightness control method of Embodiment 2 will be described with reference to FIG. 10.

First, when the electronic circuit detects that the image sensor in the video recording device starts a video recording operation, at least one PWM signal is provided through the electronic circuit (Step S1). The electronic circuit can detect the start of the video recording operation by various means. For example, as shown in Embodiment 1, the electronic circuit can detect that the image sensor starts the video recording operation through receiving a signal transmitted or received by the microcontroller unit in the video recording device. Alternatively, the electronic circuit can also be comprised in the microcontroller unit of the video recording device, and the microcontroller unit of the video recording device generates at least one PWM signal after receiving a command indicating the start of the video recording operation.

The number of PWM signals can be determined according to the requirements. In cases where visual lighting is required and provided for the user in the video-recording environment (such as video recording for gastroscope, video recording for oral, etc.), only a high duty-ratio PWM signal is output. The duty ratio of the high duty-ratio PWM signal can drive the LEDs to generate sufficient light for the image sensor to capture images with sufficient brightness. In an embodiment, in cases where lighting is required and provided for the user, at least one high duty-ratio PWM signal and one low duty-ratio PWM signal can be output.

Next, the electronic circuit generates a brightness control signal according to an exposure signal of the image sensor in the video recording device and the at least one PWM signal (Step S2). The exposure signal is a signal that determines the exposure time point of the image sensor. In different video recording devices, the manner for generating the exposure signal and the name of the exposure signal may also be different. The signal that comprises information about the time of starting the exposure and/or the time of ending the exposure can be used as an exposure signal. In the embodiment, a signal that is at high level during the period from the start of the exposure to the end of the exposure and at low level during the remaining time can be used as the exposure signal exp.

The electronic circuit generates a brightness control signal according to the exposure time of the image sensor indicated by the exposure signal and at least one PWM signal. The brightness control signal generated by the electronic circuit drives the LEDs to emit light with higher brightness during the period when the exposure signal indicates that the image sensor is exposed than during the period when the exposure signal indicates that the image sensor is not exposed. Examples of the brightness control signal will be described in detail in Embodiment 2A and Embodiment 2B.

In addition, in other modified examples, the time point of controlling brightness control does not have to be completely aligned with the exposure time. For example, the LEDs can be controlled to emit light at normal brightness only during a partial time interval of the exposure period of the image sensor, while the brightness of the LEDs can be reduced or the LEDs are turned off during at other time intervals.

Through Embodiment 2 of the present invention, the energy that is consumed by the LED can be reduced, and the thermal energy that the LEDs generate can be also reduced, even ensuring that the brightness of the images captured by the image sensor is sufficient.

Figure 11:
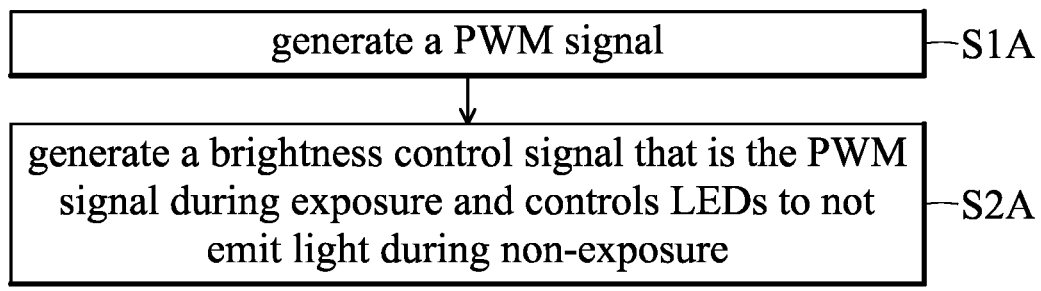
FIG. 11 is a flow chart of a brightness control method according to Embodiment 2A of the present invention.

Embodiment 2A of the present invention is a modified example of Embodiment 2. Hereinafter, differences between Embodiment 2A and Embodiment 2 will be described with reference to FIG. 11.

In step S1A, the electronic circuit generates only one PWM signal. The duty ratio of the PWM signal can drive the LEDs to emit sufficient light for the image sensor to capture images with sufficient brightness.

In Step S2A, the brightness control signal generated by the electronic circuit is the PWM signal generated in Step S1A during the period when the exposure signal indicates that the image sensor is exposed (that is, the brightness control signal is the PWM signal during exposure) and further controls the LEDs to not emit light during the period when the exposure signal indicates that the image sensor is not exposed (that is, the brightness control signal is a zero signal during non-exposure).

In addition, in other modified examples, the time point of controlling brightness control does not have to be completely aligned with the exposure time. For example, the brightness control signal can be equal to the PWM signal only during a partial time interval of the exposure period of the image sensor and further can be zero signal during other time intervals.

Through Embodiment 2A of the present invention, the LEDs can be turned off when the image sensor is not capturing images, which reduces energy consumed by the LEDs and the thermal energy that the LEDs generate, even ensuring that the brightness of the images captured by the image sensor is sufficient.

Figure 12:
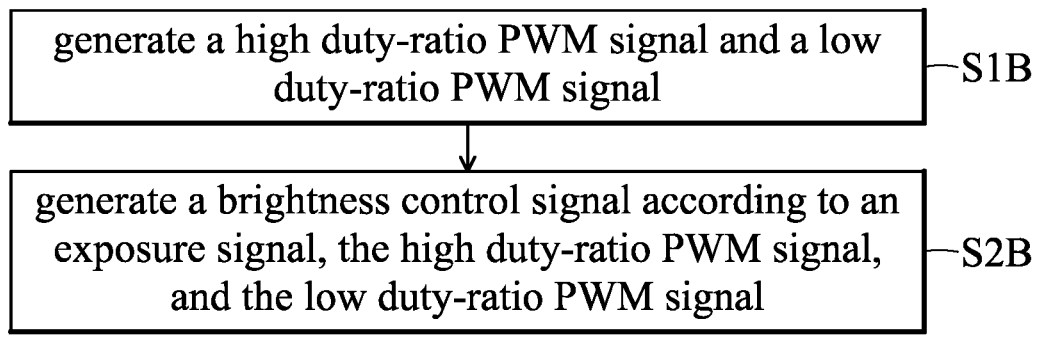
FIG. 12 is a flow chart of a brightness control method according to Embodiment 2B of the present invention.

Embodiment 2B is also a modified example of Embodiment 2. Hereinafter, differences between Embodiment 2B and Embodiment 2 will be described with reference to FIG. 12.

In Step S1B, the electronic circuit generates a high duty-ratio PWM signal and a low duty-ratio PWM signal. The duty ratio of the high duty-ratio PWM signal drives the LEDs to generate sufficient light for the image sensor to capture images with sufficient brightness. The duty ratio of the low duty-ratio PWM signal is lower than the duty ratio of the high duty-ratio PWM signal, and the duty ratio of the low duty-ratio PWM signal drives the LEDs to emit light with lower brightness. The duty ratio of the low duty-ratio PWM signal may be set to emit light that keeps the comfortable vision of the user during the switching of the brightness of the LEDs. For example, the duty ratio of the high duty-ratio PWM signal is between 20% and 80%, such as 50%. The duty ratio of the low duty-ratio PWM signal is between 0% and 20%, for example, 20%. The above values are just provided as examples. The frequency of each PWM signal can be adjusted according to experiments and/or requirements.

In Step S2B, the electronic circuit generates a brightness control signal according to the exposure signal, the high duty-ratio PWM signal, and the low duty-ratio PWM signal.

Figure 13:
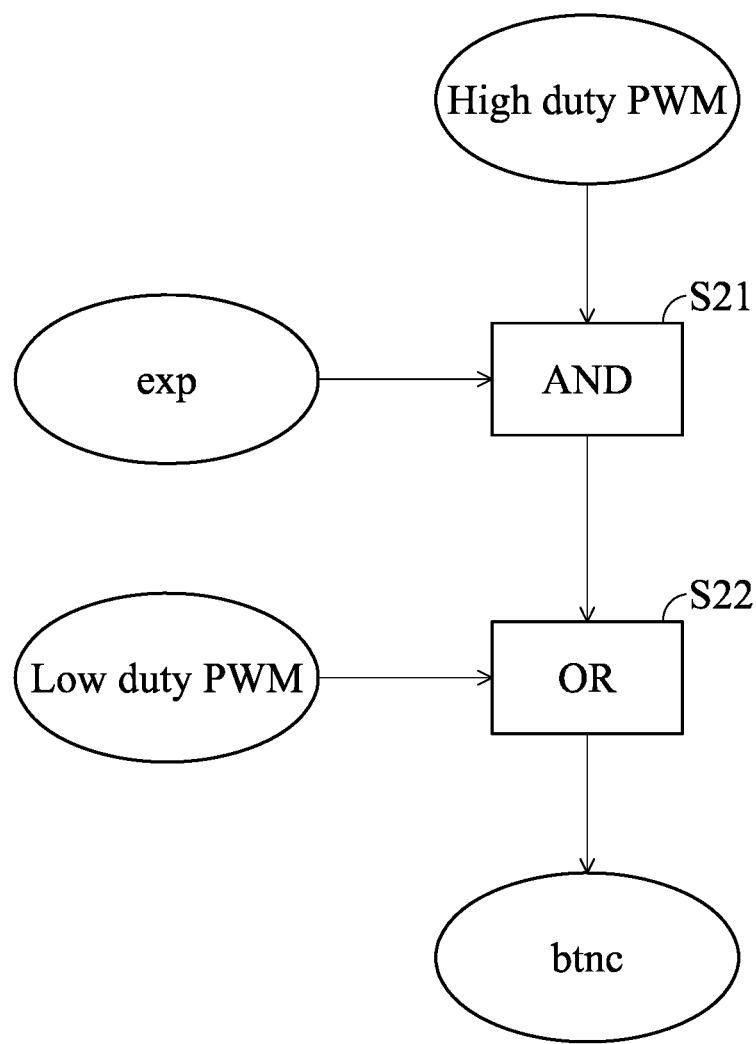
FIG. 13 is a flow chart of generating a brightness control signal based on a high duty-ratio PWM signal and a low duty-ratio PWM signal according to an exposure signal.

FIG. 13 is flow chart of an example of generating a brightness control signal. First, an AND operation is performed on a high duty-ratio PWM signal and an exposure signal (Step S21). At this time, the signal that is obtained according to the result of the AND operation is the high duty-ratio PWM signal during the period when the exposure signal indicates that the image sensor is exposed and is a zero signal during the period when the exposure signal indicates that the image sensor is not exposed. Next, an OR operation is performed on the result of the AND operation and a low duty-ratio PWM signal (Step S22). The result of the OR operation is a brightness control signal. The brightness control signal equals to the PWM signal with a high duty ratio during the period when the exposure signal indicates that the image sensor is exposed, while the brightness control signal equals to the PWM signal with a low duty ratio when the exposure signal indicates that the image sensor is not exposed.

In addition, in other modified examples, the time point of controlling brightness does not have to be completely aligned with the exposure time. For example, the brightness control signal equals to the PWM signal with a high duty ratio only during a partial time interval of the exposure period of the image sensor, while the brightness control signal can be equal to the PWM signal with during other time intervals.

Through Embodiment 2B of the present invention, the energy that is consumed by the LEDs when the image sensor is not capturing images can be reduced, the thermal energy generated by the LEDs can be also reduced, the brightness of the images captured by the image sensor is sufficient, and comfortable vision can be provided for the user.

The various embodiments described above are provided to facilitate understanding of the present invention, however, the above descriptions are not intended to limit the present invention. For example, a plurality of PWM signals can be generated, and one of the PWM signals can be selected as the brightness control signal according to the exposure signal so that the brightness changes more evenly. For example, according to the brightness of the frames generated by the image sensor of the video recording device, the duty ratio of the high duty-ratio PWM signal and the duty ratio of the low duty-ratio PWM signal can be re-adjusted.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brightness control device for controlling light-emitting diodes (LEDs) during a video recording performed by an image sensor, comprising:
   a pulse width modulation (PWM) signal output unit configured to provide at least one PWM signal; and
   a brightness control signal generation unit configured to generate a brightness control signal according to an exposure signal of the image sensor and the at least one PWM signal;
   wherein in response to the exposure signal being active, the image sensor generates a frame; and in response to the exposure signal being inactive, the image sensor generates no frame;
   wherein the at least one PWM signal comprises a high duty-ratio PWM signal and a low duty-ratio PWM signal, the brightness control signal generation unit comprises an AND gate and an OR gate, the exposure signal, along with the high duty-ratio PWM signal, are inputs of the AND gate, and an output of the AND gate, along with the low duty-ratio PWM signal, are inputs of the OR gate, and an output of the OR gate is the brightness control signal.

2. The brightness control device as claimed in claim 1, wherein a duty ratio of the high duty-ratio PWM signal is between 20% and 100%, and a duty ratio of the low duty-ratio PWM signal is between 10% and 20%.

3. A brightness control method for controlling light-emitting diodes (LEDs) during a video recording operation performed by an image sensor, comprising:
   providing at least one PWM signal; and
   generating a brightness control signal according to an exposure signal of the image sensor and the at least one PWM signal;
   wherein in response to the exposure signal being active, the image sensor generates a frame; and in response to the exposure signal being inactive, the image sensor generates no frame;
   wherein the at least one PWM signal comprises a high duty-ratio PWM signal and a low duty-ratio PWM signal;
   wherein in response to the exposure signal being active, the high duty-ratio PWM signal is used as the brightness control signal, and in response to the exposure signal being inactive, the low duty-ratio PWM signal is used as the brightness control signal.

4. The brightness control method as claimed in claim 3, wherein a duty ratio of the high duty-ratio PWM signal is between 20% and 100%, and a duty ratio of the low duty-ratio PWM signal is between 10% and 20%.

* * * * *